US00RE49679E

(19) United States
(12) Reissued Patent
Cunnane

(10) Patent Number: US RE49,679 E
(45) Date of Reissued Patent: Oct. 3, 2023

(54) MEDALLION FAN

(71) Applicant: Hunter Fan Company, Memphis, TN (US)

(72) Inventor: Jeffrey Butler Cunnane, Phoenix, AZ (US)

(73) Assignee: Hunter Fan Company, Memphis, TN (US)

(21) Appl. No.: 16/527,680

(22) Filed: Jul. 31, 2019

Related U.S. Patent Documents

Reissue of:
(64) Patent No.: 9,719,525
Issued: Aug. 1, 2017
Appl. No.: 13/901,285
Filed: May 23, 2013

(51) Int. Cl.
*F04D 19/00* (2006.01)
*F04D 29/44* (2006.01)
(Continued)

(52) U.S. Cl.
CPC ..... *F04D 29/441* (2013.01); *F04D 17/16* (2013.01); *F04D 25/088* (2013.01); *F04F 5/16* (2013.01); *F04F 5/46* (2013.01); *F04D 29/282* (2013.01); *F04D 29/703* (2013.01); *F05D 2270/173* (2013.01)

(58) Field of Classification Search
CPC ..... F04D 29/441; F04D 17/16; F04D 25/088; F04D 29/282; F04D 29/703; F05D 2270/173
See application file for complete search history.

(56) References Cited

U.S. PATENT DOCUMENTS 2,488,467 A * 11/1949 De Lisio ..... F04D 29/403 239/561
2,544,379 A * 3/1951 Davenport ..... F24F 7/065 454/344
(Continued)

FOREIGN PATENT DOCUMENTS

CN 104110815 10/2014
JP 2000283544 10/2000
(Continued)

OTHER PUBLICATIONS

Gree Cassette, Type 3 Ton GS-36TW Air Conditioner, accessed on Jul. 30, 2019, available at https://acmartbd.com/product/gree-cassette-type-3-ton-gs-36tw-air-conditioner/.

*Primary Examiner* — Joseph A Kaufman
(74) *Attorney, Agent, or Firm* — McGarry Bair PC

(57) ABSTRACT

This invention relates to a ceiling mounted air circulating apparatus comprising, in combination: a motor; an essentially centrally located radial or axial air impeller; air guiding means; optional airflow enhancement by means of air amplification means; optional centrally located wiring path from an electrical power source to a wiring enclosure suitable for hanging a lighting fixture or chandelier; and decorative embellishments, ail of which are arranged to blend with the architectural style of a space in a manner similar to a decorative ceiling medallion, the plariform of which, when viewed from below may be circular, rectangular, or polygonal. Optionally, the apparatus of the present invention may embody any of the following; heating, cooling, filtration means, positive ion generation means, and/or air sterilization means.

7 Claims, 13 Drawing Sheets

(51) Int. Cl.

| | |
|---|---|
| ***F04D 25/08*** | (2006.01) |
| ***F04D 17/16*** | (2006.01) |
| ***F04D 29/28*** | (2006.01) |
| ***F04D 29/70*** | (2006.01) |
| ***F04F 5/16*** | (2006.01) |
| ***F04F 5/46*** | (2006.01) |

(56) References Cited

U.S. PATENT DOCUMENTS 2,047,208 A * 7/1962 Coanda ..... D02G 1/161 239/DIG. 7
3,223,828 A 12/1965 Mast
3,243,102 A * 3/1966 McMahan ..... F04D 29/441 415/208.2
5,975,853 A * 11/1999 Lackey ..... F04D 25/088 248/343
6,123,618 A * 9/2000 Day ..... F04D 25/088 454/230
7,879,299 B2 2/2011 McEllen
7,931,449 B2 * 4/2011 Fitton ..... F04D 25/08 417/198
9,004,858 B2 4/2015 Nicolas et al.
9,022,731 B2 5/2015 Seccareccia
9,194,595 B2 11/2015 Lundgreen et al.
9,528,529 B1 12/2016 Kraft
9,534,610 B2 1/2017 Stewart et al.
9,631,627 B2 4/2017 Avedon
9,714,663 B1 7/2017 Avedon
9,797,411 B2 10/2017 Dyson et al.
9,797,413 B2 10/2017 Stewart et al.
9,829,004 B2 11/2017 Ikeda et al.
10,309,667 B2 6/2019 Choo et al.
10,352,325 B2 7/2019 Hiner et al.
10,487,852 B2 11/2019 Avedon
2009/0022588 A1 * 1/2009 Chen ..... H05K 7/20172 415/218.1
2010/0232957 A1 * 9/2010 Horng ..... F04D 29/441 415/208.1
2012/0163972 A1 * 6/2012 Dyson ..... F04D 25/08 415/224
2014/0099200 A1 * 4/2014 Huang ..... F04D 29/063 415/230
2015/0093983 A1 4/2015 Jeong
2019/0234423 A1 * 8/2019 Schaafsma ..... F04D 29/547

FOREIGN PATENT DOCUMENTS

JP 2001349573 12/2001
KR 100654723 B1 11/2006

* cited by examiner

SECTION A-A

SECTION A-A

DETAIL B

SECTION C-C

SECTION A-A

DETAIL B

SECTION A-A

MEDALLION FAN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This relates to the field of Ceiling Mounted Fans used to circulate air to provide convective cooling of the occupants of a space and to provide better temperature distribution during heating season and to a lesser extent, the general field of heating, ventilating and air conditioning.

BACKGROUND OF THE INVENTION

The common bladed ceiling fan was invented in 1887 by Philip Diehl. Over the years, many improvements in function were made and there have been many variations in style, but the general form of a motor suspended from the ceiling, directly or at the end of a post, driving a plurality of pitched blades commonly referred to as paddles has remained the same.

For a discussion of existing ceiling fans of this type see, for example, Pearce, U.S. Design Patent 297,456 issued Aug. 30, 1988; Gajewski, U.S. Pat. No. 7,481,626 B2, issued Jan. 27, 2009; Wing Hang Chan, U.S. Design Patent D680,210 S.

Before the advent of mechanical air conditioning, ceiling fans were common in residential, commercial, and industrial buildings, but they lost popularity with the increased penetration of central air conditioning.

Recently residential ceiling fans have experienced a resurgence, with many new homes often being equipped with multiple fans. The popularity or even necessity of ceiling fans has grown steadily with the cost of air conditioning and heating. Some concerns or drawbacks persist however. For example, bladed ceiling fans will cause flickering shadows if light passes through the rotating blades and flickering reflections in eyeglasses. These can cause headaches in people who are trying to focus their vision as in reading or doing close work Such as hand assembly. It is also believed that such flickering light could possibly trigger an epileptic seizure in some individuals. Bladed fans by nature of their design cause a pulsating air flow that some people find objectionable.

Low ceilings present a problem, even to those considering a close mounted fan, because the rotating blades pass too close to the occupants.

The primary direction of airflow from a common ceiling fan is axial to the rotation. When such a fan is mounted over a dining table, food is cooled too quickly.

Many interior designers consider a typical ceiling fan to be contrary to the aesthetic design intent of a living space and would prefer an attractive pendant, chandelier or other type of lighting fixture. As a result, existing fans are often replaced with such a fixture during remodeling.

Alternative designs have emerged to address some of these concerns for example, Hiner, U.S. Design Patents D6765435, Feb. 19, 2013, and D676952 S, Feb. 26, 2013, disclose a clever bladeless fan comprising a plurality of parallel, vertically spaced co-radial rings concentrically disposed and driven to rotate about the shaft of a driving motor.

Frictional drag acting on the air disposed between the horizontal rings causes said air to rotate and be slung out by centrifugal force.

Of similar form and function are those U.S. Patents disclosed by Fiacco in U.S. Pat. No. 6,004,365, Dec. 21, 1999; U.S. Pat. No. 6,372,005, Apr. 17. 2002; U.S. Pat. No. 6,514,304 B2 Feb. 4, 2003. These similar disclosures comprise an essentially circular assembly that is rotationally driven by a motor but differ from Hiner in the means by which air is accelerated and expelled, Flacco using a plurality of curved blades which are coupled with and extend from a rotated plate similar to a traditional radial fan.

Flacco also incorporates peripherally mounted filtration means, which rotate with the impeller, for the purpose of removing particulate such as pollen, dust and tobacco smoke from the discharged air. However, accumulated particulate in said rotating filters effects balance, causing the rotating assembly to wobble.

In U.S. Pat. No. 6,514,304 B2, Flacco also discloses an assembly that is driven by a traditional ceiling fan motor that provides a wiring path and a means to attach a lighting fixture to the underside.

The design intent of these fans disclosed by Hiner and Fiacco is to create horizontal air flow parallel the ceiling and down the walls of the living space. This will more evenly distribute the temperature of the air within the living space but will provide little convective cooling since the air is not directed toward the occupants. Convective airflow over the skin of occupants has been shown to cause evaporation of a small amount of perspiration, allowing them to feel significantly cooler at higher temperatures. (Analysis of Standards Options For Ceiling Fans, PG&E May 2004)

A unique attempt to solve some of these problems can be seen in Day, U.S. Pat. No. 6,123,618 Feb. 24, 1999, disclosing an Air Movement Apparatus comprising, as disclosed, an essentially toroidal shaped body, having upper and lower cambered surfaces, a peripheral surface which defines a rim and an axial opening defining an essentially conical inner surface the larger diameter of which intersects with the said upper surface. A first barrier member resembles the frustum of an inverted cone, the conical surface of which is concentric and proximate with the conical internal surface of the toroidal body to form an annular air passage. An air movement means, located at the lower end of said air passage, impels air at a high velocity up through said passage where it exits at an acute angle to the upper surface of the toroidal body.

A low pressure area is established, in accordance with Bernoulli's principle, between the high velocity air flow, and the cambered upper surface, in a manner similar to an airfoil, the relatively high angle of attack together with an annular notch adjacent to the exit point of high velocity air, generates turbulence in the form of ring vortices, causing surrounding air to become entrained thus amplifying the amount of air that is in motion. These low pressure vortices follow the surface and wrap past the rim where they gradually shear off in an outward to downward direction.

The upper surfaces of this apparatus must be clear of obstruction to allow air to circulate. Therefore, the body of this apparatus must be mounted a distance below the ceiling on a post similar to a ceiling fan, as described in the disclosure of Day.

Another attempt to solve some of the stated problems can be seen in Seccareccia, WO 2011/054093 AI. May 12, 2011, in which a Centrifugal Ceiling Fan Is disclosed. This design comprises an upper, bowl shaped, housing with intake ports and a lower, bowl shaped, housing with outlet ports. The upper housing encloses a motor which drives a centrifugal impeller housed .in the lower housing. Air is drawn in through the intake ports and passes into the lower housing where it is expelled through the outlet ports. This design solves the problems caused by external rotating blades but still hangs from the ceiling similar to a common ceiling fan A distinct disadvantage that the above disclosed devices of Day and Seccareccia share is the inability to reverse the direction of air flow from ceiling to floor for cooling season, or, from floor to ceiling, for heating season.

Ceiling Medallions are used to add aesthetic embellishment to a ceiling usually central to a room. In vintage homes they were generally hand crafted from wood or cast in various materials such as piaster. They can be created to reflect any architectural period and taste. A lighting pendent, chandelier or ceiling fan is most commonly mounted central to the medallion. They are also useful in relocating the hang point of a fixture within the perimeter of the medallion without the need to relocate wiring or patch the ceiling. For examples of ceiling medallions see: Julliard, U.S. Pat. No. 6,667,109 Sep. 23, 2002, Lackey, et al., U.S. Pat. No. 7,501,17382 Mar. 10, 2009 and Mc Ellen, U.S. Pat. No. 7,879,299B2 Feb. 1, 2011 which uniquely embodies UV Sterilization. This invention is intended to serve the same functions as a ceiling fan without the stated disadvantages but also to combine the function and general appearance of a ceiling medallion.

Any device that circulates air can also stir up dust and pollen and other particulate matter which can then be inhaled by the occupants of a space and also settle on furnishings. A static electrical charge can collect on the blades of most fans, which will cause an accumulation of said particulate on these blades. It is an optional intent-of the invention to provide means to filter said particulate from the airstream.

In an energy conscious society, it is advisable to leverage methods that may decrease the amount of energy consumed while maintaining an equal amount of work achieved. It is an optional object of the present invention to incorporate airflow amplification means, also known as fluid amplification, common to the art, to achieve these increased efficiencies. For a discussion of such amplification means see; Day, U.S. Pat. No. 6,123,618, Feb. 24, 1999 mentioned above as well as De Lisio, U.S. Pat. No. 2,488,467, Nov. 15, 1949; Davenport, U.S. Pat. No. 2,544,379, Mar. 6, 1951; Coanda, U.S. Pat. No. 3,047,208, Jul. 31, 1962; Fitton, U.S. Pat. No. 7,931,449, Apr. 26, 2011.

It is also advisable in such a society to provide heating or cooling only to those rooms of a building where it is needed. As an example, the south and west facing areas of a building may need to be cooled while the north and east facing areas may still require heat. it is also an optional intent of the invention to embody heating or cooling means that will be part of a central heating and/or cooling distribution system.

BRIEF DESCRIPTION OF THE DRAWING FIGURES

Figure 1:
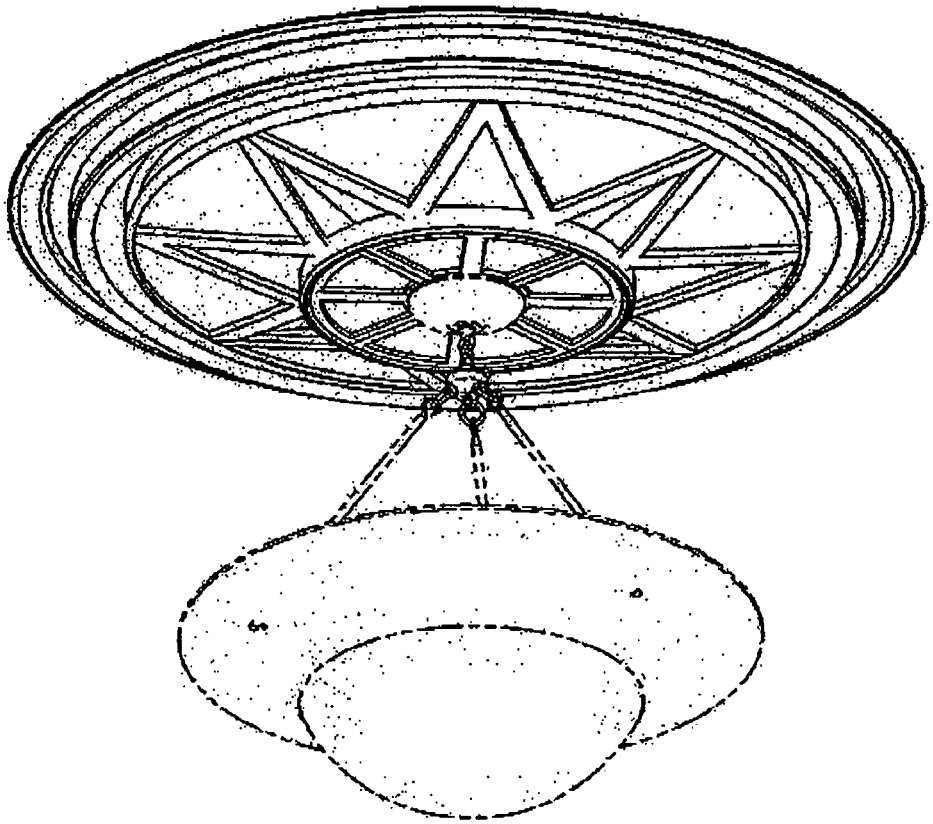
FIG. 1 is an overall view of a preferred embodiment of the invention with a lighting fixture mounted. (Lighting fixture is shown in phantom.)
Figure 2:
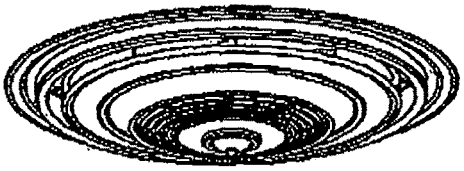
FIG. 2 is an overall view of a preferred embodiment of the invention.
Figure 2A:
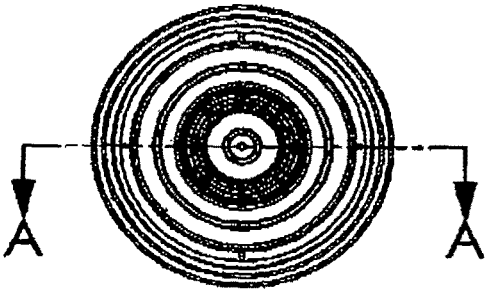
FIG. 2A is a bottom side plan view showing the location of Section line A-A which Section is further detailed in FIG. 2B, Section A-A.
Figure 2B:
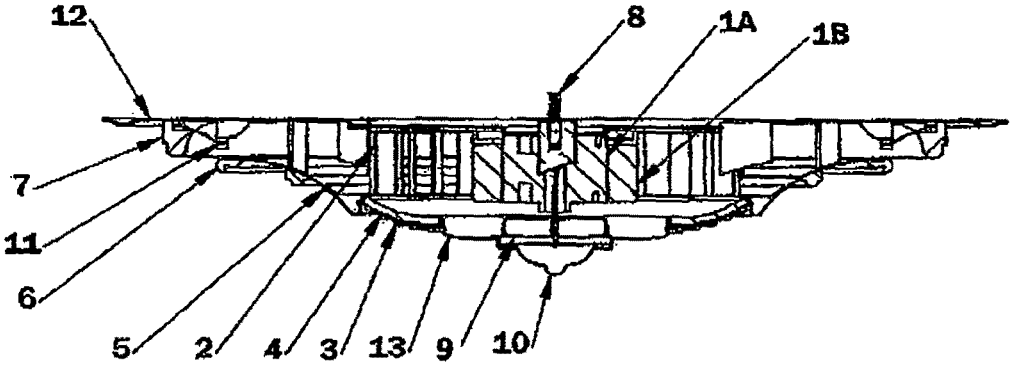

FIG. 2B Section A-A is a cut away view of an embodiment of FIG. 1. in which the impeller is a centrifugal type common to the trade.

Figure 3:
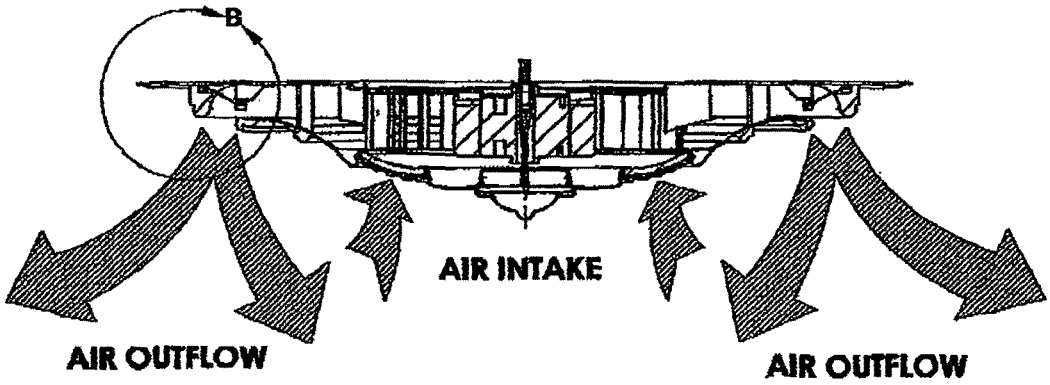

FIG. 3 Section A-A is a flow diagram of the embodiment of FIG. 2 in cooling season.

Figure 3A:
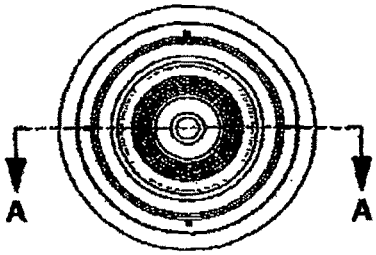

FIG. 3A shows the location of section line A-A of FIG. 3.

Figure 3B:
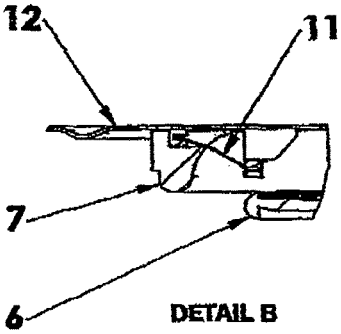

FIG. 3B shows the positioning of discharge components of the embodiment of FIG. 1 in cooling season configuration.

Figure 3C:
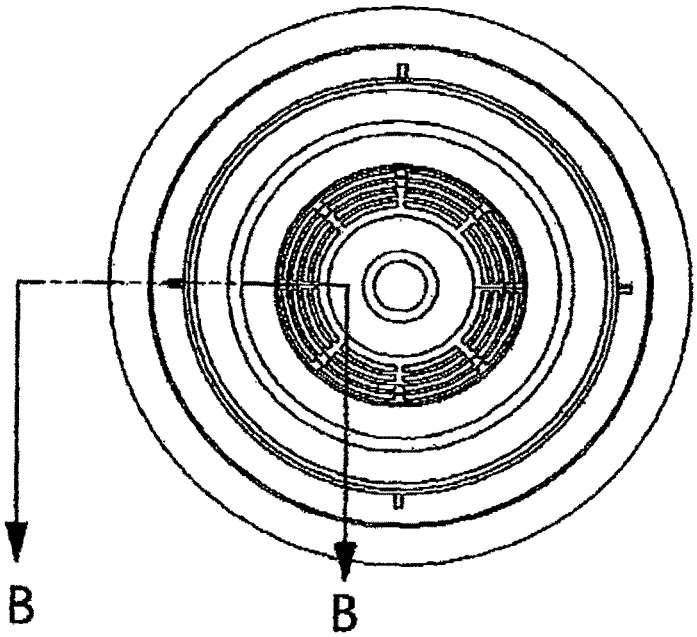
Figure 3D:
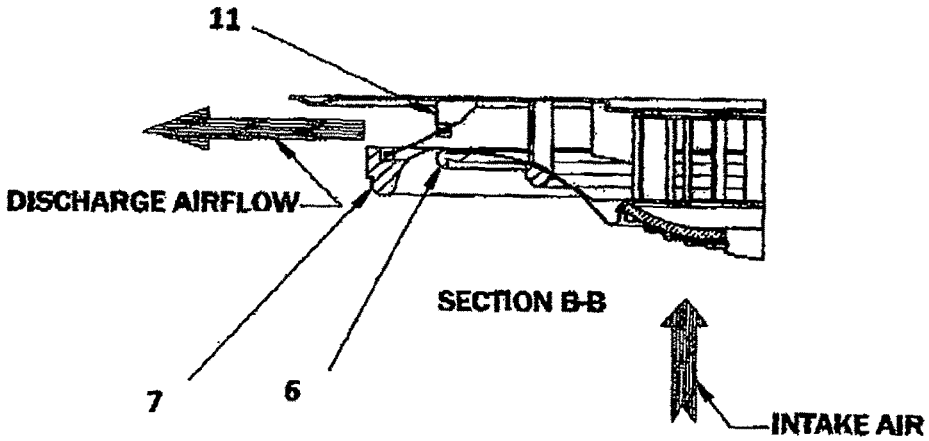

FIG. 3C is a bottom side plan view of the embodiment of FIG. 1 showing the location of Section Line B-B which Section is further detailed in FIG. 3D, Section B-B.

FIG. 3D Section B-B is a detail of discharge components of the embodiment of FIG. 2 in warming season configuration.

Figure 4:
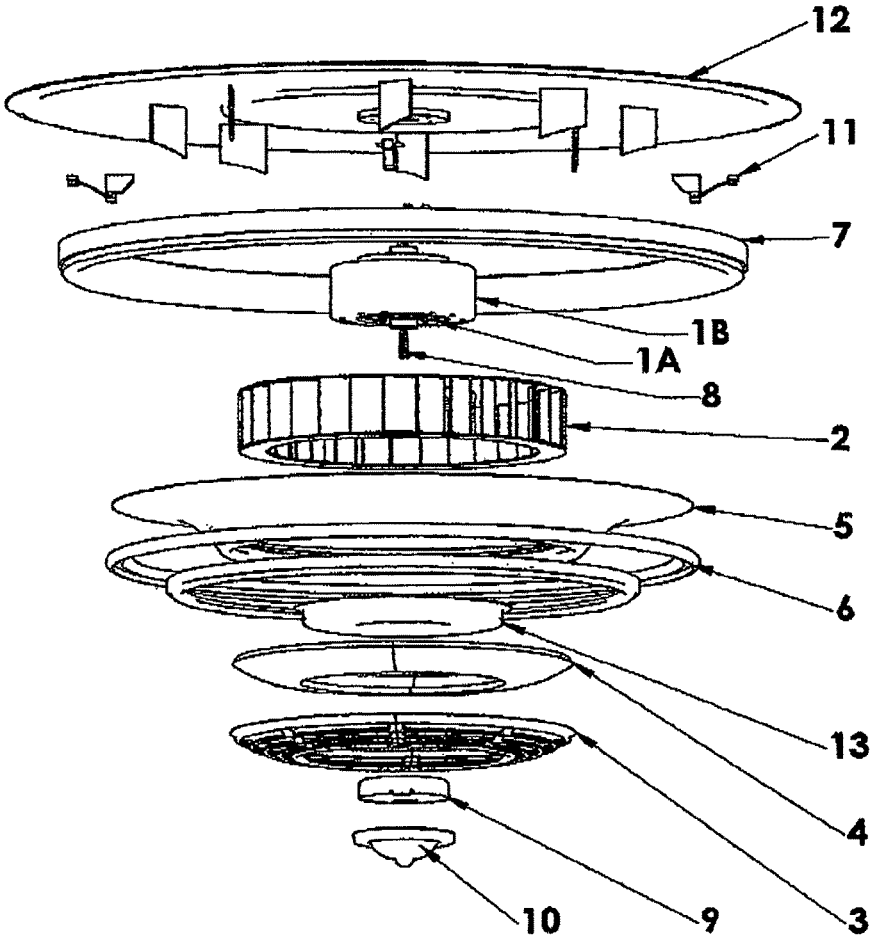

FIG. 4 is an exploded view of the preferred embodiment of FIG. 2

Figure 5:
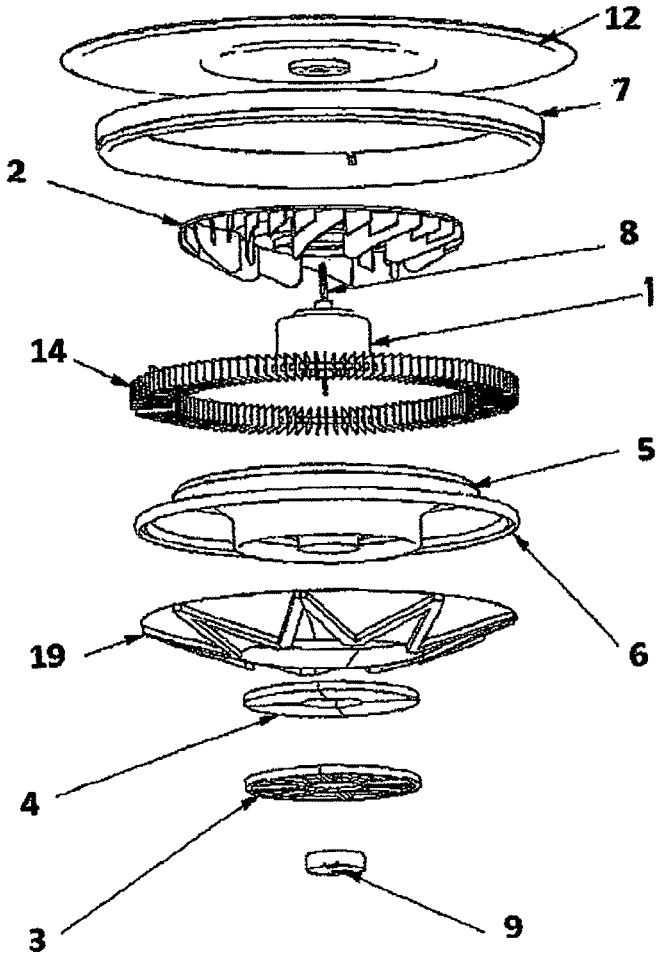

FIG. 5 is an exploded view of the embodiment of FIG. 2 where the impeller is a radial impeller and incorporates cooling means.

Figure 6:
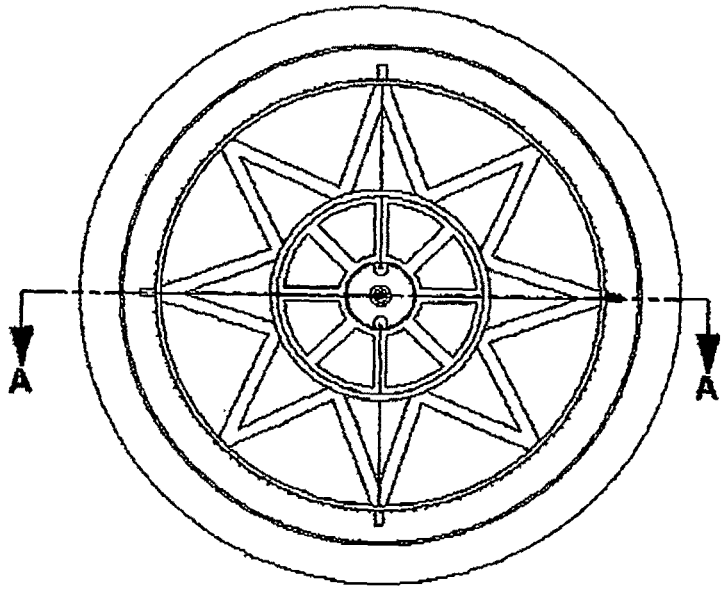
Figure 6A:
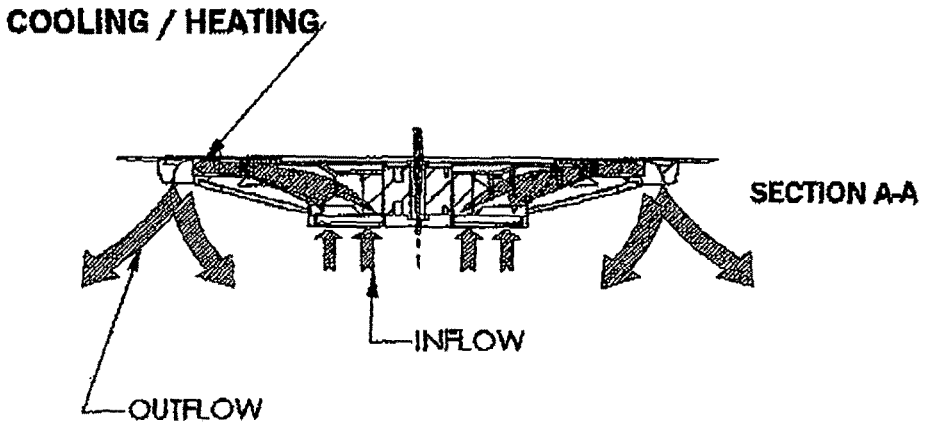

FIG. 6 is a bottom side plan view showing the location of Section line A-A which Section is further detailed in FIG. 6A, Section A-A.

FIG. 6A is a flow diagram of the embodiment in FIG. 5.

Figure 7:
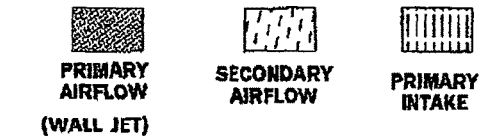
Figure 7:
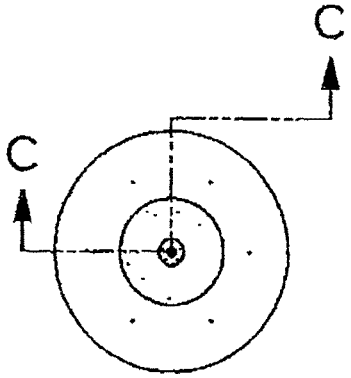
Figure 7A:
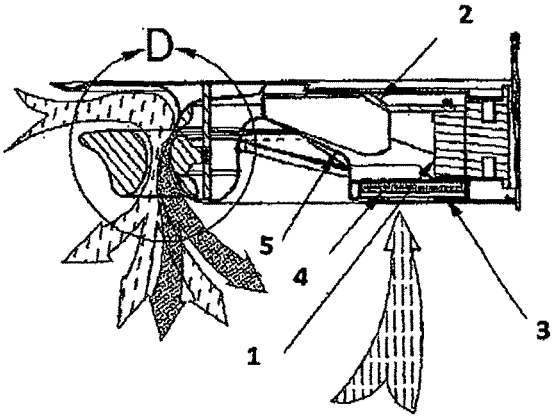

FIG. 7 is a bottom side plan view an embodiment wherein the impeller is a radial impeller and in which air discharged from said impeller is collected in a plenum from where it is discharged through an air amplification means thus increasing the total airflow and showing the location of Section Line C-C, which Section is further detailed in FIG. 7A, Section C-C.

FIG. 7A is a cutaway view of the embodiment of FIG. 7 showing the flow of air in cooling season configuration.

Figure 7B:
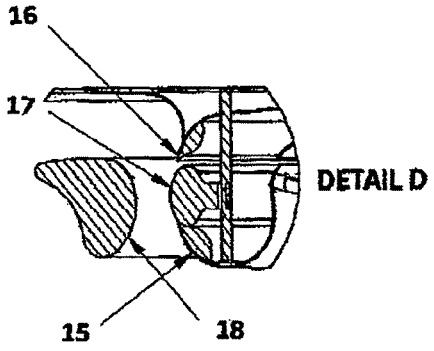
Figure 8:
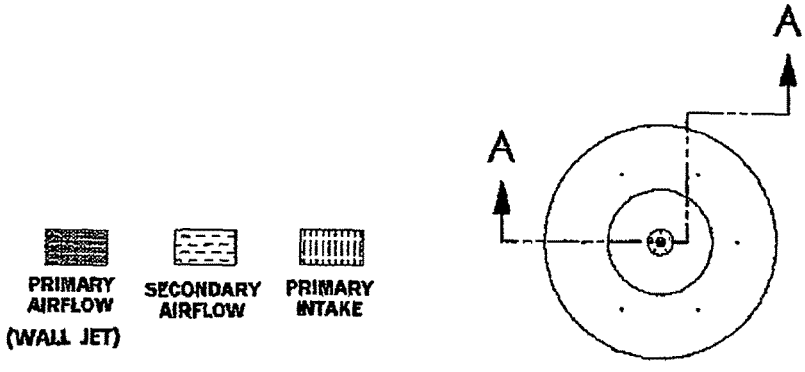

FIG. 7B further details the configuration of discharge components in cooling season configuration FIG. 8 is bottom side plan view the embodiment of FIG. 7 showing the location of Section Line A-A.

Figure 8A:
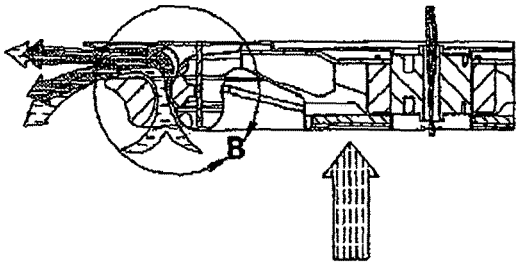

FIG. 8A is an airflow diagram of the embodiment of FIG. 7 detailing reversed airflow.

Figure 8B:
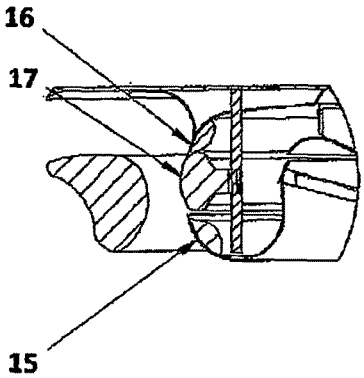

FIG. 8B shows the configuration of discharge components during reversed airflow.

Figure 9:
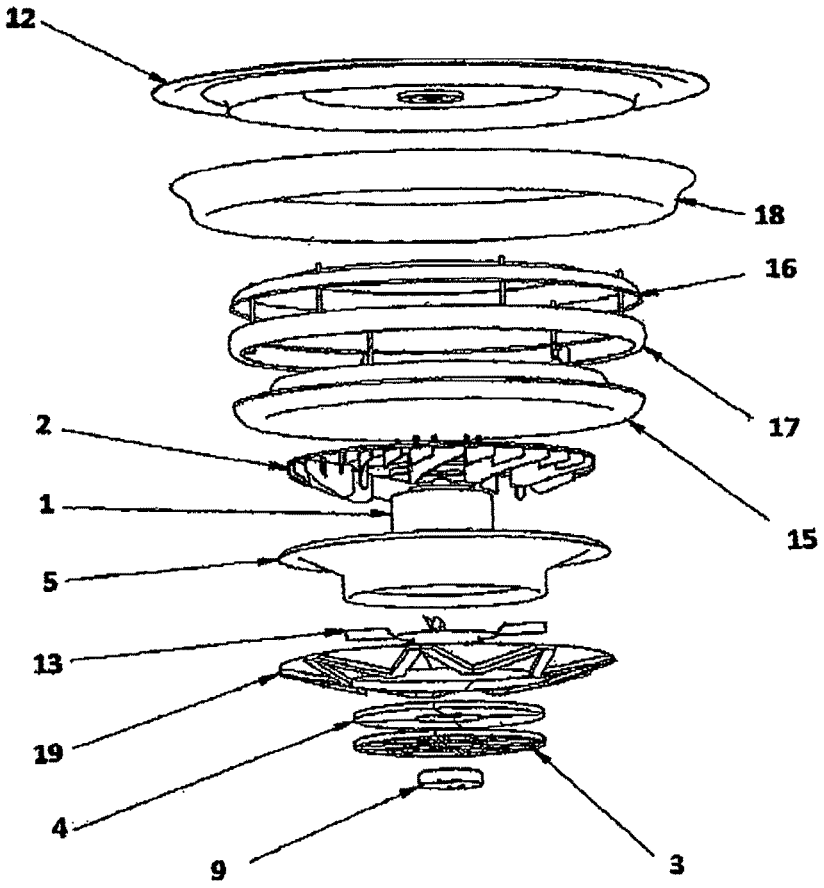

FIG. 9 is an exploded view of the embodiment of FIG. 7

Figure 10:
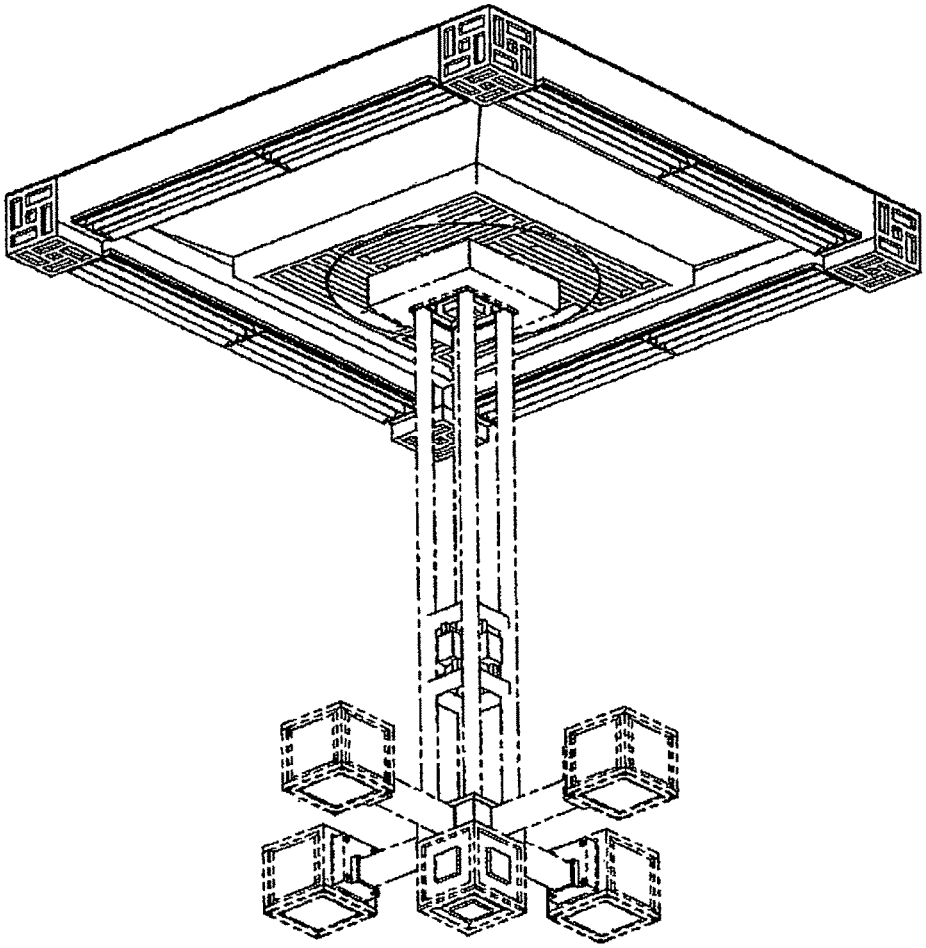

FIG. 10 is an optional embodiment of the embodiment in FIG. 1 wherein the housing is square and with an attached pendent light (Shown in phantom.)

Figure 11:
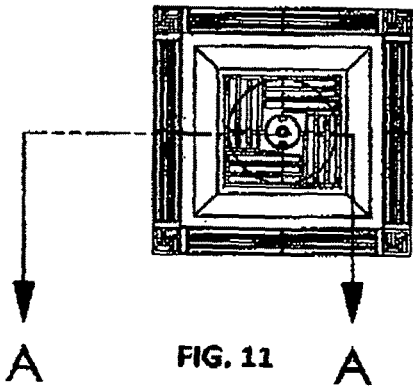

FIG. 11 is a bottom side plan view of the embodiment of FIG. 10.

Figure 11A:
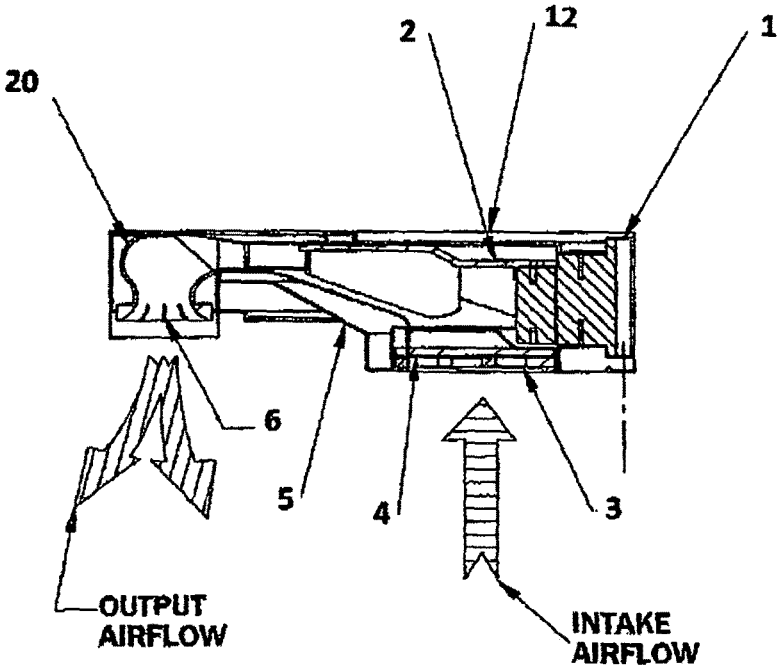

FIG. 11A is an air flow diagram of the embodiment of FIG. 10

Figure 12:
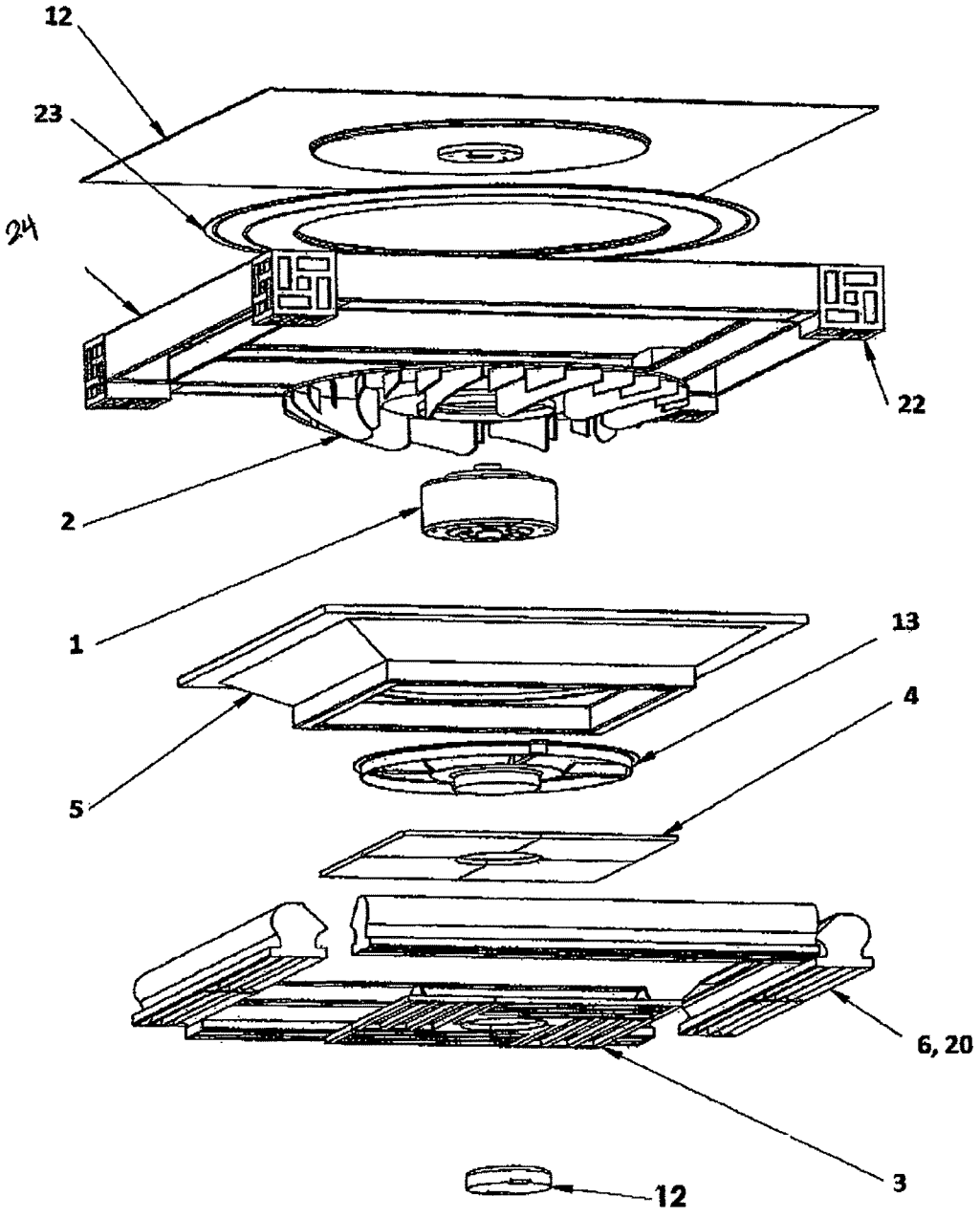

FIG. 12 is an exploded view of the embodiment in FIG. 10

SUMMARY OF THE INVENTION

The primary object of the present invention is to provide a quiet, attractive, energy efficient air circulating device that is mounted coplanar to, and extends a minimal distance from a ceiling, said device combining the functions of a ceiling fan with the functions and aesthetic appeal of a ceiling medallion but which also provides a solution to some of the stated shortcomings of the prior art.

It is a further object of the invention to provide such a device from which a lighting fixture, pendent or chandelier may be mounted as shown in FIG. 1.

It is a further object of some embodiments of the invention to optionally embody a means to filter dust, pollen and other particulate matter from the circulating airstream.

It is a further object of some embodiments of the invention to optionally embody, any of the following; heating, cooling, positive ion generation means, and/or air sterilization means.

DETAILED DESCRIPTION OF THE INVENTION

According to a broad aspect of the present invention there is provided an air circulating device comprising a ceiling plate which is mounted coplanar to a ceiling and to which is mounted an air inlet; air impelling means which in preferred embodiments is driven by a motor; internal airflow channeling means; primary airflow discharge outlet and means to direct the discharge airflow in the direction intended. All of the forgoing is to be structured in such a manner that the outer surfaces provide an external appearance similar to a ceiling medallion.

It is within the scope of the invention that said structure may be generally circular, rectangular or polygonal and may have decorative embellishment about the perimeter and on downward facing surfaces.

In the simplest embodiment, the top surface of a ceiling plate is mounted coplanar to a ceiling, proximate to an electrical supply run within said ceiling and said ceiling plate is rigidly affixed to a supporting frame member of said ceiling. Additional fastening means may be required peripherally to hold the ceiling plate and corresponding assembly tightly to the ceiling sheeting material.

In preferred embodiments, the static part of a motor is fixedly mounted, centrally within the enclosing structure and an air impelling means is driven by the driving part of the motor. The motor drives the air impelling means rotationally causing air to be drawn in through an intake opening, be pushed through internal airflow channeling means and expelled through one or more air discharge openings. Air deflecting means proximate to said air discharge openings distributes discharged air about the surrounding area to provide the desired level of comfort. Optionally said air deflecting means may be alternately repositioned to distribute discharged air in a direction more or less downward from the ceiling in cooling season or an outward, horizontal direction across the ceiling in heating season.

According to a further aspect of the present invention, a wiring box on the downward facing side of the enclosing structure is provided to enclose motor controlling devices and for the optional mounting of a lighting fixture or chandelier.

According to a further optional aspect of the invention filtration means are mounted at the primary airstream inlet such that air drawn into the inlet must pass though said filtration means before it enters the area of the impelling means. it is fully within the scope of this aspect of the invention that the filtration means be either or both mechanical or electrostatic.

According to a further optional aspect of the invention, primary air discharged by said impelling means temporarily dwells within a plenum chamber where it is becomes pressurized before it is further discharged at high velocity through a narrow, slotted opening that is coincident with and tangent to a cambered surface such as to cause consistent fluid wall attachment of said discharged air.

Said fluid wall attachment is well known to the art as the Coanda Effect and said cambered surface is known as a Coanda Surface and the attached fluid flow is also known as a Wall Jet A significant amount of adjacent ambient air will then become entrained in the flow of the wall jet to create a secondary airflow. In preferred embodiments, a second cambered surface, is positioned a distance peripheral and adjacent to the said Coanda surface to act as a guide for said secondary airflow. In said embodiments, adjacent cambered surfaces converge near the horizontal mid- plane which is normal to the chord of both cambered surfaces, and diverge at both the inlet and outlet of secondary flow, thereby funneling ambient air into the area of convergence and causing an area of tow pressure at the discharge, and thereby drawing additional ambient air into the secondary airflow.

In the present invention a unique Coanda flow reversing mechanism is provided by a section of said Coanda surface that can be repositioned so as to close the slotted opening through which said wall jet is generated and to open a second slotted opening oriented in the opposite direction, causing a reversal of the wall jet and secondary airflow. This allows overall airflow to be directed from ceiling to floor in the cooling season and floor to ceiling in the heating season.

According to a further optional aspect of the invention, discharged air may be further conditioned by positive ion generation means or ultra violet radiation.

According to a further optional aspect of the invention, heating or cooling means may be mounted in the airstream.

A preferred embodiment of the present invention, is shown in FIG. 2, 2A, 2B, FIG. 3, 3A, 3B, 3C, 3D and FIG. 4.

Referring to FIG. 2B and FIG. 3, a ceiling plate 12, is fixedly mounted coplanar to a ceiling and motor 1 has a centrally located stator 1A fixedly mounted to ceiling plate 12 and an external, peripheral rotor 18 on which an air impelling means 2, that in this embodiment, is a centrifugal impeller of a design common to the trade, is affixed. Air is drawn in by air impelling means 2, enters through Filter Cover 3 and passes through Filtration Means 4. Air is pushed by air impelling means 2, between impeller shroud 5 and ceiling plate 12, where it is directed in a generally downward direction by diverter guides 6 and 7.

A hollow conduit though motor stator 1A, provides a pathway for a wiring harness 8 from an electrical supply within the ceiling to an electrical wiring box 9, which is provided for electrical motor controlling devices and the optional mounting of a light or chandelier. Filter support 13, provides support for filtration means 4 and filter cover 3.

A cover 10 may be provided if no lighting fixture is to be mounted. Ceiling plate 12 provides a frame and support for the preceding assembly and also provides the means to affix the said assembly to the ceiling.

In this embodiment of the present invention, peripherally mounted air deflection means may be adapted to direct effluent air downward for summer cooling or horizontally across the ceiling to improve heat distribution during the heating season. In FIG. 3,3B, 3D, a plurality of positioning devices 11, which in this embodiment are of a snap-over-center spring type, allow diverter guide 7 to be positioned either to direct discharged air flow downward for cooling FIG. 3B, or across the ceiling for improved distribution of warm air during heating season FIG. 3D.

In other embodiments of the present invention, FIG. 5 and 6, the air acceleration means is a radial impeller. It is fully within the scope of this invention that a plurality of stationary blades, peripheral to the radial impeller, known to the trade as stators be arrayed at angles more or less tangential to impeller axis of rotation to improve efficiency but at such an to angle and quantity as to prevent resonance and consequential noise.

In this embodiment of the present invention, FIG. 5 and FIG. 6, optional heat exchanging means is mounted in the air flow path. Said heat exchanging means may be of a tubular radiator type common to the trade which is supplied with a flow of heated or chilled liquid or evaporating refrigerant to provide additional heating or cooling.

In FIG. 5, FIG. 6 and 6A the motor 1 is affixed to the Ceiling plate 12, which is mounted coplanar to a ceiling, proximate to an electrical power source, and the radial impeller 2 is affixed to the rotatable body of the motor 1.

Referring to FIG. 6A, the rotating impeller 2 causes air to be drawn in through filter cover 3 and through filtration means 4, after which it is pushed by radial impeller 2 through a passage between impeller shroud 5 and ceiling plate 12, to be discharged through cooling I heating means 14. Air discharged through heating I cooling means 14 is then directed in a generally downward direction by diverters 6 and 7. In this embodiment, the curved surfaces of diverters 6 and 7 serve as foils to disperse discharged air about the room. It is within the scope of the present invention that other diverting means, such as louvers, fixed or adjustable, may be used to disperse discharged air. Item 19 is a decorative cover. Electrical wiring box 9 is attached to the non-rotating body of motor 1 and wiring harness 8 passes, from said electrical power source within the ceiling, through said non-rotating body of motor 1 to electrical wiring box 9 which, in preferred embodiments encloses motor controlling devices and also provides means to mount and supply power to an optionally attached lighting fixture.

It is it is within the scope of the present invention that said heating means be of another type such as electric resistive heating.

It is also within the scope of the present invention that said heating or cooling means be either totally integrated within the present invention or be part of a heating and/or cooling system central to a building.

In a further embodiment, FIG. 7,7A, 7B, FIG. 8, 8A, 8B, and FIG. 9, airflow amplification means, which in this embodiment comprises a unique, reversible, Coanda Effect, air amplifying assembly. Air enters a radial impeller in a fashion similar to the foregoing embodiments, but is compressed by said radial impeller and is then discharged into a plenum chamber at an elevated pressure where it dwells before being discharged through a slot, at an accelerated velocity, as a primary airflow in an essentially tangential relationship to a cambered surface, which in this embodiment is an exterior wall of said plenum chamber, and to which said primary air flow remains in fluid attachment as a wall jet.

Said cambered surface is one of a pair of peripherally offset, concentric and adjacent, cambered surface features. In this embodiment, a peripheral Flow Guide is positioned external to the circumference and concentric to said plenum chamber and has a cambered inner surface which is in mirrored relation to the Coanda Surface of said plenum chamber.

Ambient air is drawn in and entrained by the primary wall jet and by the low pressure zone, created, at the divergence of the two cambered surfaces. This significantly multiplies the total volume of air flow for a given motor size. The cambered Coanda surface of the plenum chamber is comprised of first and second fixed sections and a repositionable portion that defines the position and direction of the primary discharge slot and thus the direction of both primary and secondary airflow.

In FIG. 7A, Air flow is directed from ceiling to floor. Motor 1 drives impeller 2 rotationally which draws ambient air in as a primary intake through Filter Cover 3 and Filter 4 and then drives said intake air through a narrowing section formed by the impeller shroud 5 and the Ceiling Plate 12 until it enters the plenum chamber which comprises first and second plenum sections 15, 16 and repositionable section 17, where it dwells and becomes pressurized until discharged through a slot defined by First Plenum Section 16 and repositionable plenum section 17. The cambered surfaces of 17 and 15 form the Coanda surface to which said primary wall jet becomes fluidly attached.

The peripherally facing surfaces of Plenum sections 15, 16 and 17, and the adjacent inward facing surface of Flow Guide 18, together form a pair of geometrically opposed cambered surfaces, converging at the entrance of airflow and diverging at the discharge. Ambient air becomes entrained with the primary wall jet, establishing a coincident secondary flow.

An area of low pressure is formed near the point of discharge as air exits the flow path between said diverging walls causing additional ambient air to be entrained.

The flow of entrained ambient air shrouds the high velocity air flow from the plenum and acts as a barrier to attenuate sound created by said high velocity air flow.

In FIG. 8A repositionable plenum section 17 has been repositioned for flow reversal. The slot through which the primary wall jet flow was generated between first plenum section 16 and repositionable section 17 in FIG. 7A and 7B has closed and a slot is now open between second plenum section 15 and repositionable plenum section 17.

This new geometry mirrors, to some extent, the geometry of this area revealed previously in FIG. 7A and 7B. The wall jet now flows in the opposite direction in fluid attachment to the Coanda surface formed by plenum section 15 and repositioned plenum section 17, as does the secondary flow of entrained ambient air, causing total airflow to be directed from floor to ceiling as would be most advantageous during the heating season.

FIG. 9 is provided to better understand the general arrangement of components of the embodiment revealed in FIG. 7 and FIG. 8 where the stator of motor 1 is fixedly mounted to the ceiling plate 12 and the impeller 2 is mounted to the driven rotatable body of motor 1. The rotating impeller causes air to be drawn in through intake grating 3 and through filtration means 4 which is supported by filter support 13, after which it is pushed through a passage between impeller shroud 5, and ceiling plate 12 to where it is compressed within a plenum chamber, which comprises plenum sections, 15 and 17 and repositionable plenum section 16.

Said pressurized air is then discharged from said plenum chamber through a slot between either plenum sections 15 and 17 or 16 and 17 depending on the position of repositionable plenum section 17, coincident with a Coanda surface formed by the outward facing surfaces of either Plenum sections 15 and 17 or 16 and 17, The outwardly facing combined surfaces of said plenum chamber together with the inwardly facing cambered surface of flow guide 18 which essentially mirrors the cambered surfaces of said plenum chamber, form a pair of peripherally offset, adjacent and geometrically opposite cambered surfaces.

Said surfaces converge to funnel ambient air into the area influenced by the wall jet and cause an area of low pressure where these surfaces diverge.

In another embodiment of the device of the present invention revealed in FIG. 10, FIG. 11, 11A and FIG. 12, the outline of the device, as viewed from below, is non-circular and, as illustrated in this embodiment, is rectangular. It is, however, fully within the scope of this embodiment that said plan form could be polygonal.

FIG. 10 is an illustration of this embodiment with a pendant fixture attached. (Shown in phantom) in FIG. 11, FIG. 11A the motor, 1, is mounted to the Ceiling plate, Item 12, and the impeller, 2, is mounted to the rotatable body of the motor 1.

The rotating impeller causes air to be drawn in through intake grating, 3, and through filtration means, Item 4, after which it is directed through a passage formed between impeller shrouds 5, 23 and ceiling plate 12 into plenums 20, from which it is discharged and distributed about the room by diverters, Items 6.

FIG. 12 is provided to better understand the general arrangement of components where the motor 1, is mounted to the Ceiling plate 12, and the impeller, Item 2, is mounted to the rotatable body of the motor 1. Item 3 is the intake grating, Item 4 is filtration means, Item 5 and Item 23 are the impeller shrouds, Items 20 are the plenums and Items 6, are the diverters. Item 13 is a filter support Items 22 are decorative blocks, items 24 are plenum covers and Item 9 is a wiring box which encloses motor controlling devices and also provides means to mount and supply power to an optionally attached lighting fixture per FIG. 12.

The invention claimed is:

1. A ceiling mounted air circulating device comprising:

a ceiling plate with a top surface intended to be mounted coplanar to a ceiling;

an impeller with a central axis extending downward perpendicular to the ceiling, the impeller configured to draw air in through an air inlet;

a plenum chamber configured to receive air from the impeller, the plenum chamber comprising first and second fixed sections and a repositionable section;

wherein the repositionable section is configured to move from a first position adjacent to the first fixed section, to a second position adjacent to the second fixed section;

a flow guide located at a periphery of the air circulating device relative to the plenum chamber, the flow guide defining an airflow channel, the airflow channel comprising a first opening and a second opening;

wherein said air impeller pressurizes air within the plenum chamber, from which air is subsequently discharged to the airflow channel, as a primary airflow, tangent to a cambered surface, establishing a wall jet which is fluidly attached to said cambered surface and causes ambient air to be entrained in the airflow channel;

wherein, when the repositionable section is in the first position, the cambered surface is formed from the first fixed section and the repositionable section, and ambient air is entrained from the first opening of the airflow channel;

wherein, when the repositionable section is in the second position, the cambered surface is formed from the second fixed section and the repositionable section, and ambient air is entrained from the second opening of the airflow channel.

2. The ceiling mounted air circulating device of claim 1, wherein the air circulating device has an appearance of a ceiling medallion.

3. The ceiling mounted air circulating device of claim 1, [further comprising peripherally mounted air deflection means which] *wherein the repositionable section* may be adapted to direct [discharged] *discharge* air downward for summer cooling or parallel to the ceiling to improve heat distribution during the heating season.

4. The ceiling mounted air circulating device of claim 1, wherein filtration means are mounted at the air inlet such that air drawn into the air inlet must pass through said filtration means before entering the location of said air impeller.

5. The ceiling mounted air circulating device of claim 1, further comprising a wiring box for the optional mounting and electrical connection of a lighting fixture or chandelier.

6. The ceiling mounted air circulating device of claim 1, further comprising air heating or cooling means.

7. The ceiling mounted air circulating device of claim 1, further comprising, when viewed from the bottom, a rectangular, square, or polygonal outline, and wherein air discharged by the impeller is directed to a plurality of plenum chambers, from which the air is subsequently directed to be discharged through a plurality of air diverting devices which cause said discharged air to be better distributed about a room.

* * * * *